United States Patent [19]

Shino et al.

[11] Patent Number: 5,039,500

[45] Date of Patent: * Aug. 13, 1991

[54] PROCESS FOR PRODUCING XENON

[75] Inventors: Masami Shino; Hideaki Takano; Jitsuo Nakata, all of Wakayama, Japan

[73] Assignee: Kyodo Oxygen Co., Ltd., Wakayama, Japan

[*] Notice: The portion of the term of this patent subsequent to Oct. 17, 2006 has been disclaimed.

[21] Appl. No.: 273,052

[22] Filed: Nov. 18, 1988

[51] Int. Cl.$^5$ .................... B01D 53/04; B01D 53/36; C01B 23/00

[52] U.S. Cl. ........................ 423/262; 55/66; 423/245.3; 62/18; 62/22

[58] Field of Search ................ 423/262, 245.3; 55/66; 62/12, 18, 22

[56] References Cited

U.S. PATENT DOCUMENTS

| | | | |
|---|---|---|---|
| 1,670,614 | 5/1924 | Blaringhem | 423/262 |
| 2,793,507 | 4/1950 | Hnilicka | 62/12 |
| 2,962,868 | 12/1960 | Dennis | 423/262 |
| 3,063,217 | 11/1962 | Armond et al. | 55/66 |
| 3,222,879 | 12/1965 | Stoklosinski | 66/22 |
| 4,283,367 | 8/1981 | Koeppe et al. | 55/66 |
| 4,421,536 | 12/1983 | Mori et al. | 62/18 |
| 4,874,592 | 10/1989 | Shino et al. | 423/262 |

OTHER PUBLICATIONS

Kohl and Riesenberg, "Gas Purification"; 3rd Gulf Publishing, Houston, Tex., 1979, pp. 574–575.

Primary Examiner—Michael L. Lewis
Assistant Examiner—Brian M. Bolam
Attorney, Agent, or Firm—Wall and Roehrig

[57] ABSTRACT

The present invention relates to a process for producing high purity xenon safely at a high yield from liquid oxygen in a main condenser of an air separating unit.

The present invention involves a process for concentrating and recovering xenon by gasifying and introducing liquid oxygen led out from the main condenser in the air separating unit into an adsorption column field with an adsorbent which adsorbs xenon for adsorption and desorption, and a process for rectifying and recovering xenon by introducing concentrated xenon gas into a solid-gas separating column, which is cooled to a temperature at which xenon is solidified but components other than xenon such as oxygen and krypton in the concentrated xenon gas are not solidified to, catch xenon by condensation, then heating the solid-gas separating column after evacuating gas components remained therein.

5 Claims, 3 Drawing Sheets

PROCESS FOR PRODUCING XENON

The present invention relates to a process for producing high purity xenon safely at a high yield from liquid oxygen in a main condenser of an air separating unit, particularly, it relates to a process for producing xenon wherein the liquid oxygen contained xenon is gasified and introduced into an adsorption column filled with a xenon adsorbent to concentrate and recover xenon, and led to a cooling tower to solidify xenon, thereafter the tower is evacuated and heated for gasification to recover xenon.

PRIOR ART

Since xenon is contained in a very small quantity as 0.086 ppm in air, at present it is produced concurrently with krypton from liquid oxygen in the main condenser of upper rectifying column in a large size air separating unit, and no process is known to produce xenon alone.

In the prior art process, there is a fear that CmHn, in particular, methane in the liquid oxygen is concentrated with concentration of krypton to cause explosion.

Therefore, various processes have been proposed hitherto, one of which is disclosed in technical references (61-2-1) P430--431 by Fuji Technosystem Co., Ltd. wherein concentrations of krypton and xenon are restricted to the extent where there is no danger of explosion and CmHn are concentrated by a catalyst.

There is also another process of concentrating krypton and xenon by rectification after installing an argon substitution column to substitute oxygen and argon therein (Japanese Patent Application Laid-Open No. Tokukou-Sho-22937/1972), or concentrating krypton and xenon by rectification after substituting high-pressure nitrogen and oxygen (Japanese Patent Application Laid-Open No. Tokukai-Sho-95583/1982).

In liquid oxygen led out from the main condenser of rectifying column in the air separating unit, several tens of ppm of xenon is contained besides krypton and CmHn, thus when krypton and xenon are produced concurrently, CmHn such as methane or the like are also concentrated with the concentration of krypton.

Accordingly, the concentration of xenon must be restrained and CmHn must be removed by combustion with a catalyst or oxygen and argon or nitrogen must be substituted.

Since the concentration of krypton and xenon is restrained from a viewpoint of preventing CmHn from exploding, a multi-stage rectifying operation is necessary for obtaining high purity krypton and xenon besides substituting oxygen and argon or oxygen and high-pressure nitrogen, results in expensive facility cost and a low yield of xenon.

In view of such existing circumstances, it is an object of the present invention to propose a process for producing xenon safely at a high purity, high yield and low cost from liquid oxygen led out from the main condenser of upper rectifying column in an air separating unit.

SUMMARY OF THE INVENTION

In liquid oxygen led out from the condenser of upper rectifying column in an air separating unit, several tens of ppm of xenon and a small quantity of krypton and CmHn such as methane are contained.

The present invention involves a process for concentrating and recovering xenon by gasifying and introducing liquid oxygen led out from the main condenser in the air separating unit into an adsorption column field with an adsorbent which adsorbs xenon for adsorption and desorption, and a process for rectifying and recovering xenon by introducing concentrated xenon gas into a solid-gas separating column, which is cooled to a temperature at which xenon is solidified but components other than xenon such as oxygen and krypton in the concentrated xenon gas are not solidified to, catch xenon by condensation, then heating the solid-gas separating column after evacuating gas components remained therein.

CONFIGURATION OF THE INVENTION

In the present invention, the reason for employing an adsorptive recovering process in which xenon is caught and recovered by an adsorbent is to recover xenon at a high yield and to eliminate danger of explosion caused by the concentration of methane.

That is, by using the adsorbent which adsorbs xenon selectively, the xenon in oxygen gas containing xenon is adsorbed and caught by the adsorbent. Xenon exceeding the range of xenon adsorption quantity of the adsorbent is not adsorbed and flows out from the adsorption column.

At this point of time, if the supply of xenon contained oxygen gas to the adsorption column is stopped and xenon is desorbed and recovered, concentrated xenon can be obtained at a high yield.

Since methane is hardly adsorbed by the adsorbent which adsorbs xenon selectively, it flows out from the adsorption column continuously while xenon is adsorbed and caught. Therefore, methane is not concentrated and the danger of explosion can be avoided.

Next, the reason for employing a solid-gas separation process in which xenon is solidified and caught in the present invention is that, a temperature condition wherein krypton and oxygen are not solidified but only xenon is solidified can be obtained by utilizing solidification temperature differentials of xenon, krypton and oxygen in the concentrated xenon gas, and high purity xenon can be obtained by solid-gas separation in this temperature condition.

Meanwhile, in rectified and recovered xenon, a small quantity of krypton, oxygen and CmHn are contained, thus CmHn can be removed by adding a catalytic combustion process to the aforesaid process, as a result a purity of xenon can be improved.

The reason for desorbing and recovering after reintroducing the rectified xenon gas till breakthrough into the adsorption column filled with the adsorbent which adsorbs xenon selectively is to remove impurities of krypton and oxygen to improve the purity of xenon.

Furthermore, the reason for purging inside the adsorption column by part of the product gas before recovering the high purity xenon, is to expel krypton and oxygen remained in the column outside the system to keep the purity of xenon higher with the small number of columns.

As adsorbents for adsorbing the xenon selectively, silica gel and activated carbon or zeolite having a molecular sieving effect are used.

ADVANTAGES OF THE INVENTION

According to the present invention, since xenon is mainly separated by adsorption or solidification from liquid oxygen led out from the main condenser of upper rectifying column in the air separating unit, highly concentrated xenon can be obtained at a high purity without any danger of explosion of CmHn.

In the present invention, since xenon is concentrated with priority mainly by adsorbing and solidifying operations, when compared to the conventional process for producing xenon concurrently with krypton employing rectification as the nucleus, high-pressure facilities as well as substitution by oxygen or nitrogen are not necessary, and high purity xenon can be produced safely at a high yield and low cost without any danger of explosion caused by the concentration of CmHn.

PREFERRED EMBODIMENTS OF THE INVENTION

Embodiment 1

Figure 1:
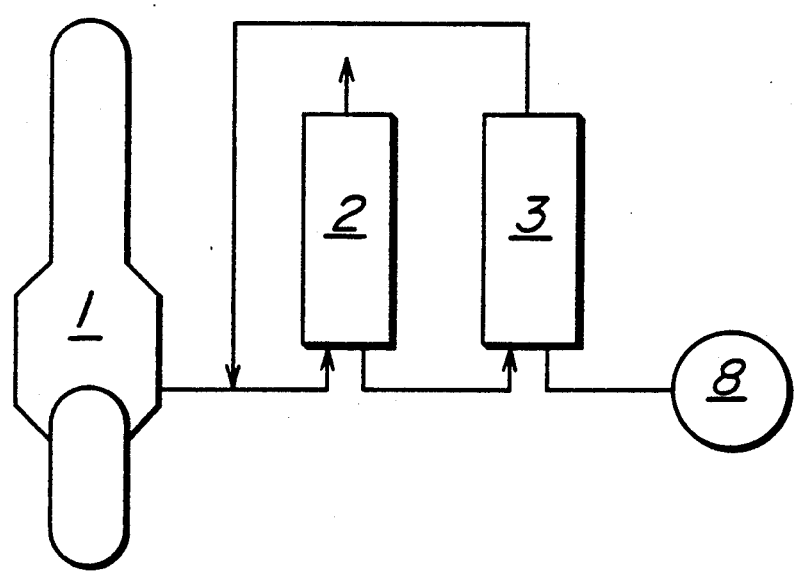
FIG. 1 is a flow diagram in the first embodiment of the present invention.

As shown in a flow diagram of FIG. 1, when liquid oxygen (oxygen producing quantity is 15000 $Nm^3/hr$) led out from the main condenser of upper rectifying column (1) is extracted and gasified, contained xenon was 31 ppm, krypton was 70 ppm, methane was 38 ppm and other CmHn was very little.

When the gas is heated to a temperature of 120° C. and depressurized to 100 Torr to recover after introducing into an adsorption column (2) filled with silica gel and cooled to −170° C. till xenon is broken through, xenon was 1.4%, krypton was 0.14%, CmHn was 0.066% and the rest was oxygen concentration. The concentration of CmHn at this time was below the explosion limit.

The concentrated xenon gas was cooled to −175° C. and admitted into a solid-gas separating column (3) packed with a filler stainless steel wire wool to solidify and catch xenon.

Thereafter, vacuumed to 0.7 Torr at −175° C. and after removing oxygen, krypton and CmHn in the solid-gas separating column (3), heated to the normal temperature to recover xenon in a product gas tank (8). The purity of recovered xenon at this time was 97%.

By returning off gas from the solid-gas separating column (3) to the inlet side of adsorption column, the total yield of xenon was 95%.

Embodiment 2

Figure 2:
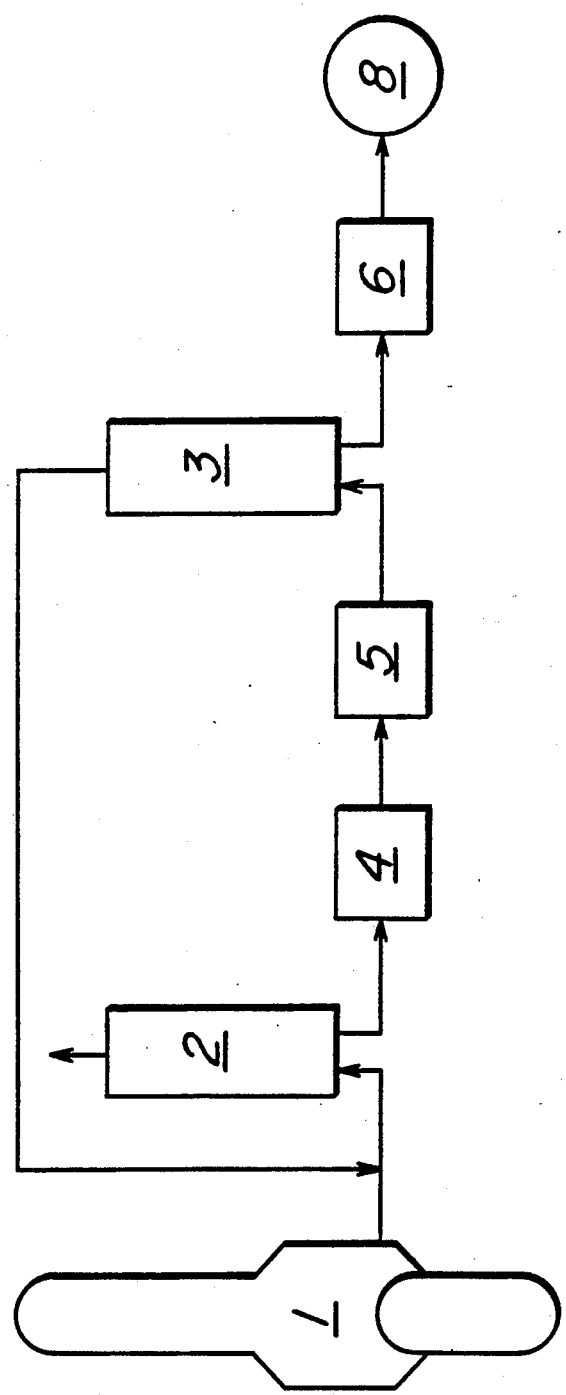
FIG. 2 is a flow diagram in the second embodiment of the present invention.

As shown in a flow diagram of FIG. 2, in the same manner as the embodiment 1, after concentrating and recovering xenon in the adsorption column (2), it was passed through a catalyst column (4), carbon dioxide and moisture adsorptive removal column (5) to remove CmHn.

Furthermore, under same conditions as the embodiment 1, xenon gas rectified in the solid-gas separating column (3) was introduced into a deoxidation column (6) to remove oxygen and obtain high purity xenon of 99.9% or over. The yield of xenon at this time was 93%.

Embodiment 3

Figure 3:
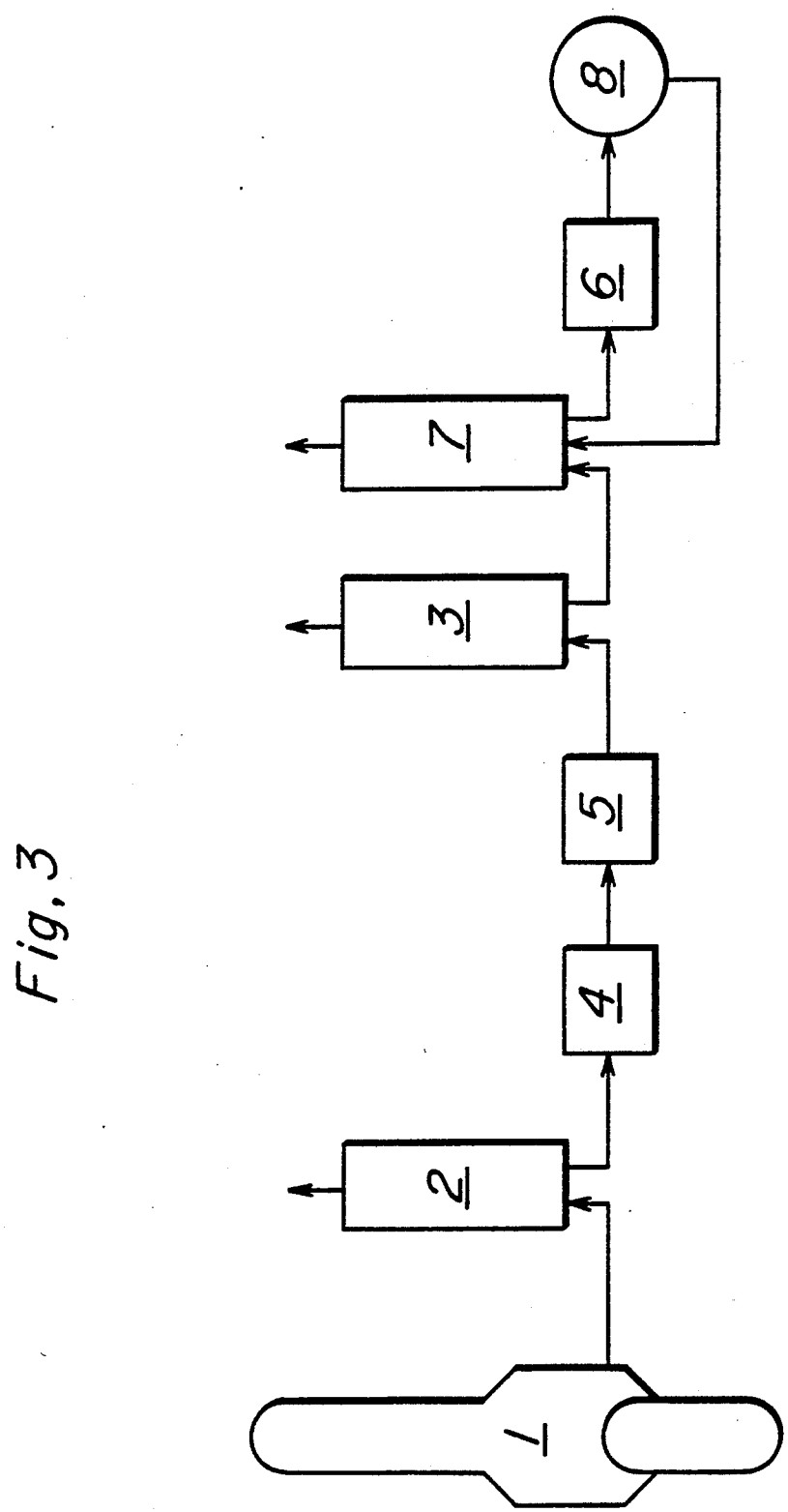
FIG. 3 is a flow diagram in the third embodiment of the present invention.

As shown in a flow diagram of FIG. 3, in the same manner as the embodiment 2, after introducing xenon gas obtained from the solid-gas separating column (3) into the adsorption column (7) filled with activated carbon and cooled to −20° C. till xenon is broken through, the adsorption column (7) was purged with part of the product gas and heated thereafter to 90° C. to desorb and recover xenon.

Thereafter, by passing it through the deoxidation column (6) to remove a very small quantity of oxygen, xenon was obtained at a purity higher than 99.95%.

By returning off gas from the solid-gas separating column (3) to the inlet side of adsorption column (2), and recycling exhaust gas from the adsorption column (7) having a low xenon concentration to the inlet side of solid-gas separating column (3), and those having a high xenon concentration to the inlet side of adsorption column (7), xenon was recovered by 93%.

What is claimed is:

1. In an air separation plant for producing oxygen, the method of separating xenon from liquid oxygen received from the main condenser of the upper rectifying column of the air separating unit in a separation plant which comprises the steps of gasifying the xenon containing liquid oxygen into a gas stream, passing the gasified xenon containing gas stream into an adsorption column containing an adsorption agent, operating said adsorption column at a preselected temperature and pressure so as to adsorb on said adsorption agent, xenon but not oxygen, krypton or hydrocarbons contained in said gasified stream;

purging said adsorption column with a gas and by heating whereby xenon is desorbed and concentrated;

introducing the concentrated xenon from said adsorption column into a solid-gas separating column;

cooling said solid-gas separating column to a temperature at which xenon is solidified but at which oxygen, krypton and hydrocarbons are not solidified;

purging said solid-gas column of all gas components remaining therein, whereby xenon is further concentrated and purified;

heating said solidified xenon in said solid gas column to gasify and drive off the concentrated and purified xenon; and collecting and storing said concentrated and purified xenon.

2. The method of claim 1 further including gasifying the adsorbed components of the gas stream; and passing the gasified adsorbed components of the gas stream through a catalytic combustion chamber to remove further traces of hydrocarbons before introducing the components to the solid-gas separating column.

3. The method of claim 1 further including passing the concentrated and purified xenon from said solid-gas separating column to a second adsorption column, containing an adsorption agent different than the adsorption agent in the first adsorption column; and heating the adsorbed gas in said second adsorption column to drive off the adsorbed xenon to further purify the xenon.

4. The method of claim 3 further including purging said second adsorption column with part of the xenon gas before driving off the xenon therefrom.

5. The method of claim 3 further including recirculating a portion of the effluent from said solid-gas separating column into said adsorption column, and recirculating a portion of the effluent from said second adsorption column into said solid-gas separating column.

* * * * *